United States Patent [19]

Chen

[11] Patent Number: 4,949,780
[45] Date of Patent: Aug. 21, 1990

[54] AIR CIRCULATING APPARATUS
[75] Inventor: Jui-Chin Chen, Taichung, Taiwan
[73] Assignee: Rexon Industrial Corp. Ltd., Taichung Hsien, Taiwan
[21] Appl. No.: 464,153
[22] Filed: Jan. 12, 1990
[51] Int. Cl.⁵ .............................................. F28D 17/00
[52] U.S. Cl. ........................................... 165/7; 165/54
[58] Field of Search ................... 98/33.1; 165/7, 8, 10, 165/54

[56] References Cited
U.S. PATENT DOCUMENTS

| | | | |
|---|---|---|---|
| 3,977,466 | 8/1976 | Johansson | 165/7 |
| 4,574,872 | 3/1986 | Yano et al. | 165/54 X |
| 4,611,653 | 9/1986 | Ikemura et al. | 165/54 |
| 4,646,813 | 3/1987 | Ikemura et al. | 98/33.1 X |

Primary Examiner—Harold Joyce
Attorney, Agent, or Firm—Bacon & Thomas

[57] ABSTRACT

An air circulating apparatus includes a housing which is separated into a front room and a rear room. A heat exchanging wheel is rotatably disposed in one side of the housing between the front room and the rear room. An induced draft fan and an exhaust fan are disposed in another side of the housing and respectively located within the front room and the rear room. Indoor air is drawn through a lower portion of the heat exchanging wheel by the exhaust fan, and flows out of a building. Outdoor air is drawn through an upper portion of the heat exchanging wheel by the induced draft fan and flows into the building.

4 Claims, 3 Drawing Sheets

AIR CIRCULATING APPARATUS

BACKGROUD OF THE INVENTION

The present invention relates to a circulating apparatus, and more particularly to an air circulating apparatus which has heat exchanging capability.

Air circulating fans are used to change or to make an air circulation in a building. They are not useful during winter or summer. During winter, for example, outside temperature is cooler than inside temperature of a building. When cool air is drawn into the building, indoor temperature drops rapidly. On the contrary, during summer, outside temperature is high. When hot air is drawn into the building, indoor temperature increases rapidly. Both cases may make the residents feel uncomfortable.

Air conditioners, such as air coolers or air heaters, are used to maintain a comfortable room temperature. They are expensive and have high energy consumption rate.

The present invention has arisen to mitigate and/or obviate the afore-described disadvantages of the conventional air circulating equipment.

SUMMARY OF THE INVENTION

The primary objective of the present invention is to provide an air circulating apparatus which has a heat exchanging ability for exchanging the temperature of the air flowing therethrough.

In accordance with one aspect of the invention, there is provided an air circulating apparatus which includes a housing which is separated into a front room and a rear room. A heat exchanging wheel is rotatably disposed in one side of the housing between the front room and the rear room. An induced draft fan and an exhaust fan are disposed in another side of the housing and respectively located within the front room and the rear room. Indoor air is drawn through a lower portion of the heat exchanging wheel by the exhaust fan and flows out of a building. Outdoor air is drawn through an upper portion of the heat exchanging wheel by the induced draft fan and flows into the building.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
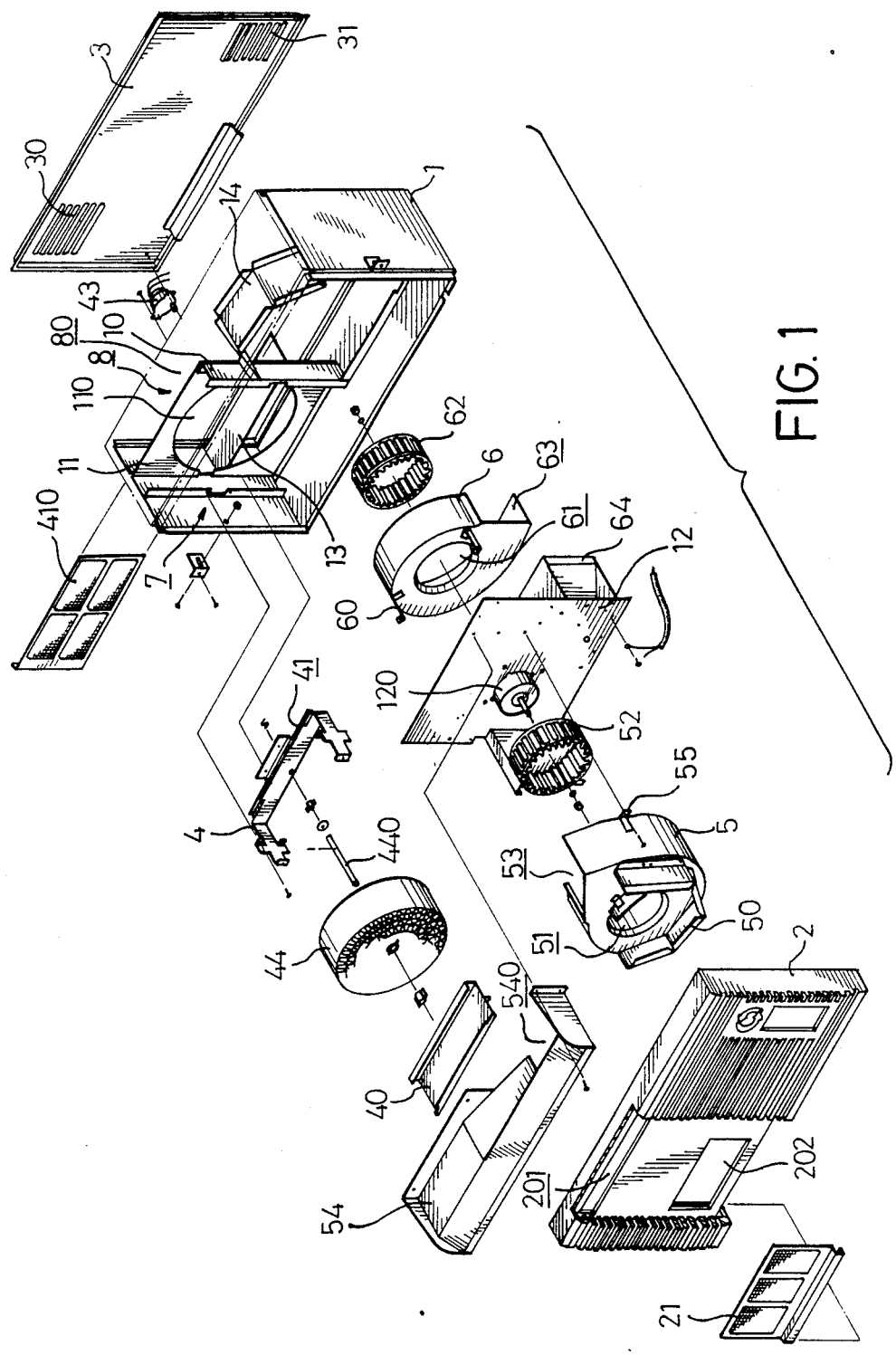
FIG. 1 is an exploded view of an air circulating apparatus in accordance with the present invention.

Referring to the drawings and initially to FIG. 1, the air circulating apparatus in accordance with the present invention comprises generally a housing 1, a front cap 2, a rear cap 3, a heat exchanging wheel 44, an induced draft fan 52 and an exhaust fan 62.

Referring to the drawings, the housing 1 is substantially rectangular with a front open end enclosed by the front cap 2 and a rear open end enclosed by the rear cap 3. An upper hole 201 and a lower hole 202 formed in the front cap 2. The lower hole 202 is covered with an air filter 21. An upper opening 30 and a lower opening 31 are formed in the rear cap 3.

Three vertical plates including a center plate 10, a left plate 11 and a right plate 12 separate the housing 1 into a front room 7 and a rear room 8. A circular opening 110 is formed in a center of the left plate 11. An upper portion of the circular opening 110 is covered with an air filter 410. The rear room 8 is separated into an upper chamber 80 and a lower chamber 81 by a rear level plate 13 and folded plate 14. A substantially U-shaped frame plate 4 is laterally fixed on a middle portion of the left plate 11. A guide slot 41 is formed on an upper surface of the center portion of the frame plate 4 for receiving the air filter 410. A front level plate 40 separates the front room 7 into an upper compartment 70 and a lower compartment 71. The heat exchanging wheel 44 with an axle 440 is provided between the frame plate 4 and the front level plate 40. A motor 43 is coupled to a rear end of the axle 440 so that the heat exchanging wheel 44 is actuated to rotate by the motor 43.

A motor 120 is fixed on the right plate 12. The induced draft fan 52 is provided in a first casing 5 which is disposed in front of the right plate 12. An inlet opening 51 and an outlet opening 53 are formed in the first casing 5. The first casing 5 is fixed to the right plate 12 by a plurality of brackets 55. A folded division plate 50 is provided in front of the inlet opening 51. A guide plate 54 with an opening 540 is laterally provided in the front room 7 above the front level plate 40 and the first casing 5. The opening 540 of the guide plate 54 is aligned with the outlet opening 53 of the first casing 5. The exhaust fan 62 is provided in a second casing 6 which is disposed below the folded plate 14. An inlet opening 61 and an outlet opening 63 are formed in the second casing 6. The casing 6 is fixed to the right plate 12 and the housing 1 by a plurality of brackets 60. The induced draft fan 52 and the exhaust fan 62 are fixed to and driven by an axle of the motor 120. A guide channel 64 is provided in a rear portion of the right plate 12 and communicates the outlet opening 63 of the second casing 6 and the lower opening 31 of the rear cap 3.

The heat exchanging wheel 44 has a honey-comb structure. A heat exchanging area of the honey-comb structure is about 2100 square meter per cubic meter. The heat exchanging wheel 44 rotates slowly, the speed thereof is about 15 round per minute. The temperature of the air flowing through the heat exchanging wheel 44 is changed by the honey-comb structure.

Figure 2:
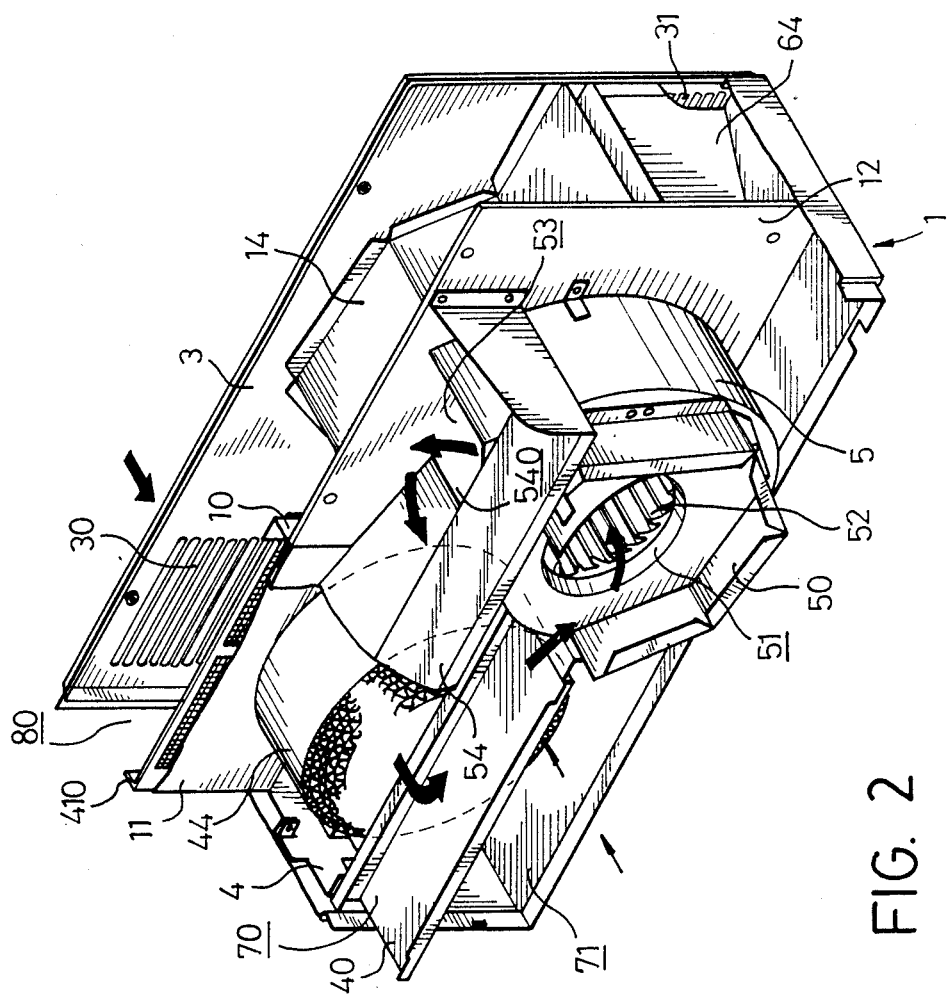
FIG. 2 is a perspective view.

The air circulating apparatus in accordance with the present invention is provided in a wall of a building so that the rear cap 3 faces outdoors and the front cap 2 faces indoors. As is best shown in FIG. 2, outdoor air is drawn by the induced draft fan 52 to flow through the upper opening 30 of the rear cap 3, the upper chamber 80, the air filter 410, the heat exchanging wheel 44, the upper compartment 70 and the induced draft fan 52, then the air is guided to flow out of the upper hole 201 of the front cap 2 by the guide plate 54.

Figure 3:
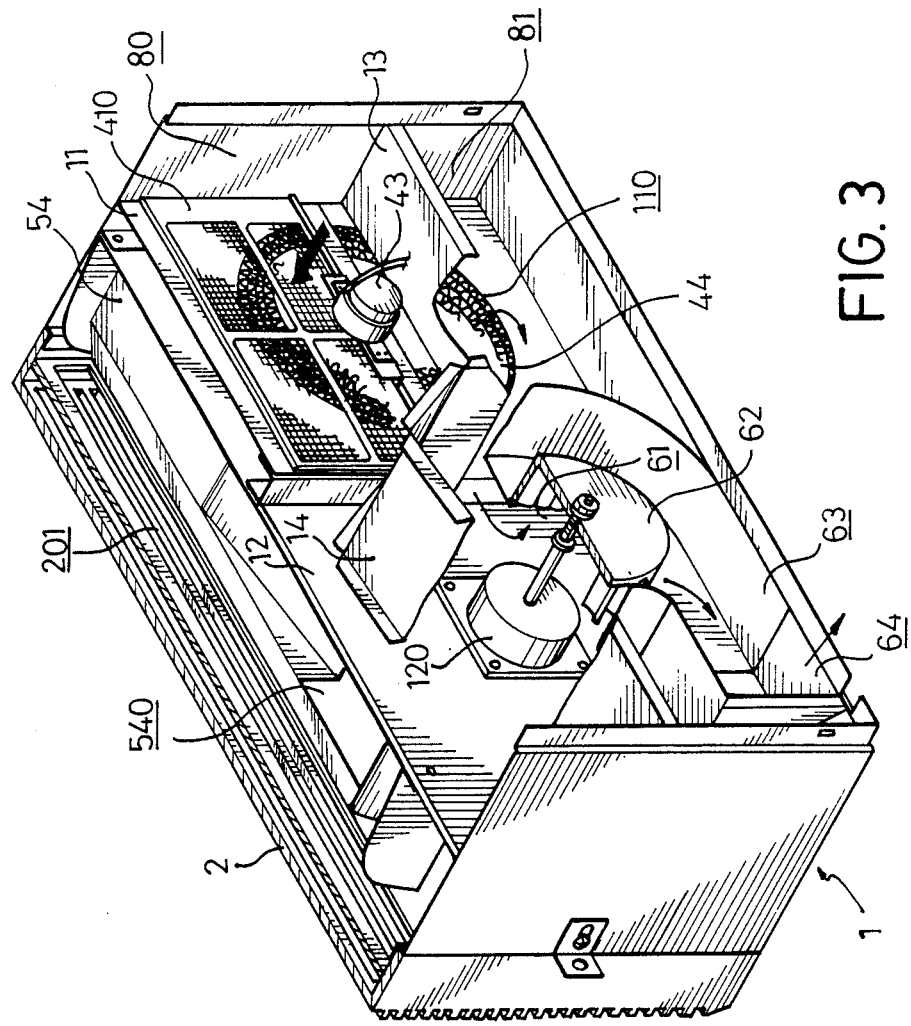
FIG. 3 is a perspective view similar to FIG. 2, but taken from an opposite angle.

Simultaneously, the exhaust fan 62 is operated when the induced draft fan 52 is operated. As shown in FIGS. 1 and 3, indoor air is drawn by the exhaust fan 62 to flow through the filter 21 of the front cap 2, the lower compartment 71, the heat exchanging wheel 44, the lower chamber 81, the inlet opening 61 and the exhaust fan 62, then the air is guided to flow out of the lower opening 31 of the rear cap 3 by the guide channel 64. Accordingly, indoor air and outdoor air are exchanged.

Referring again to FIG. 2, the function of the heat exchanging wheel 44 is described as follows. During winter, for example, indoor air is cooler than outdoor air. When indoor air is drawn to flow through the lower portion of the heat exchanging wheel 44, the heat of indoor air is conducted to the heat exchanging surfaces of the lower portion of the honey-comb structure of the heat exchanging wheel 44. When the warmer portion of the heat exchanging wheel 44 rotates, with slow speed, above the front level plate 40, the cold outdoors air is drawn to flow through the warmer portion of the heat exchanging wheel 44 so that heat is conducted to the cold air and so that the air which is drawn to flow through the warmer portion of the heat exchanging wheel 44 into the building is warmed.

On the contrary, when in summer, indoor air is cooler than outdoor air so that the air which is drawn to flow through the cooler portion of the heat exchanging wheel 44 into the building is cooled.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim

1. An air circulating apparatus comprising a housing being separated into a front room and a rear room; said front room being separated into an upper compartment and a lower compartment, said rear room being separated into an upper chamber and a lower chamber; a front cap with a first inlet opening and a first outlet opening being disposed on a front end of said housing, a rear cap with a second inlet opening and a second outlet opening being disposed on a rear end of said housing; a heat exchanging wheel being rotatably disposed in one side of said housing between said front room and said rear room, an upper portion of said heat exchanging wheel communicating said upper compartment with said upper chamber, a lower portion of said heat exchanging wheel communicating said lower compartment with said lower chamber; an induced draft fan being disposed in a first casing which is provided in an other side of said housing and located substantially in said upper compartment; an exhaust fan being disposed in a second casing which is provided substantially in said lower chamber; a guide plate being disposed in said front room above said upper compartment in order to communicate a third outlet opening of said first casing with said first outlet opening of said front cap; a fourth outlet opening of said second casing being communicated with said second outlet opening of said rear cap; a first motor being coupled to an axle of said heat exchanging wheel for operating said heat exchanging wheel; a second motor being coupled to said induced draft fan and to said exhaust fan; air in front of said front cap being drawn through said first inlet opening of said front cap and said lower portion of said heat exchanging wheel by said exhaust fan, and flowing out from said second outlet opening of said rear cap; and air behind said rear cap being drawn through said second inlet opening of said rear cap and said upper portion of said heat exchanging wheel by said induced draft fan and flowing out from said first outlet of said front cap.

2. An air circulating apparatus according to claim 1, wherein said front room and said rear room are separated by a left vertical plate and a right vertical plate, a circular hole is formed in said left plate; a frame plate is laterally fixed on a middle portion of said left plate; a front level plate is disposed in front of said heat exchanging wheel and a first folded plate is disposed on a front surface of said first casing for separating said upper compartment and said lower compartment; a rear level plate is disposed behind said heat exchanging wheel for separating said upper chamber and said lower chamber; said axle of said heat exchanging wheel is pivotally provided between said frame plate and said front level plate.

3. An air circulating apparatus according to claim 2, wherein a third inlet opening of said first casing is communicated with said upper compartment; a fourth inlet opening of said second casing is communicated with said lower chamber; and a guide channel is disposed between said fourth outlet opening of said second casing and said second outlet opening of said rear cap.

4. An air circulating apparatus according to claim 1, wherein a honey-comb structure is formed within said heat exchanging wheel for increasing heat exchanging surface thereof.

* * * * *